(12) United States Patent
Hagan (10) Patent No.: US 8,408,800 B2
(45) Date of Patent: Apr. 2, 2013

(54) CLOSED END BEARING CUP (75) Inventor: Timothy J. Hagan, Succasunna, NJ (US)

(73) Assignee: Saint-Gobain Performance Plastics Corporation, Aurora, OH (US)

(*) Notice: Subject to any disclaimer, the term of this patent is extended or adjusted under 35 U.S.C. 154(b) by 302 days.

(21) Appl. No.: 12/943,474

(22) Filed: Nov. 10, 2010

(65) Prior Publication Data
US 2011/0135232 A1 Jun. 9, 2011

Related U.S. Application Data (60) Provisional application No. 61/259,859, filed on Nov. 10, 2009.

(51) Int. Cl.
F16C 33/02 (2006.01)
B32D 33/00 (2006.01)

(52) U.S. Cl. .................. 384/296; 29/898.054

(58) Field of Classification Search .......... 384/276, 384/280, 282, 283, 286, 295, 296, 297, 569, 384/905.1; 464/132
See application file for complete search history.

(56) References Cited

U.S. PATENT DOCUMENTS

| | | | | |
|---|---|---|---|---|
| 1,384,173 A | * | 7/1921 | Wikander | 384/280 |
| 2,247,995 A | | 7/1941 | Gilbert | |
| 2,266,319 A | | 12/1941 | Hobbs | |
| 2,734,785 A | | 2/1956 | Toulmin | |
| 2,938,754 A | | 5/1960 | Lombard | |
| 3,449,032 A | | 6/1969 | Scheufler | |
| 3,514,831 A | | 6/1970 | Bruch et al. | |
| 3,539,232 A | * | 11/1970 | Batt | 384/473 |
| 3,950,834 A | * | 4/1976 | Pitner | 29/898.066 |
| 4,047,396 A | | 9/1977 | McElwain et al. | |
| 4,322,879 A | | 4/1982 | Warchol | |
| 4,533,262 A | | 8/1985 | Pedersen | |
| 4,732,818 A | | 3/1988 | Praft et al. | |
| 5,216,811 A | | 6/1993 | Jackson et al. | |
| 5,297,509 A | | 3/1994 | Murphy | |
| 5,385,413 A | | 1/1995 | Murphy et al. | |

(Continued)

FOREIGN PATENT DOCUMENTS

| | | |
|---|---|---|
| CN | 1035871 A | 9/1989 |
| CN | 1494638 A | 5/2004 |

(Continued)

OTHER PUBLICATIONS

Singh, P., Gupta, B.D., Kapur, V.K., Optimization of corrugated thrust bearing characteristics, (1993) Wear, 167 (2), pp. 109-120. Abstract Only.

(Continued)

Primary Examiner — Phillip A Johnson
(74) Attorney, Agent, or Firm — Abel Law Group, LLP; Chi S. Kim (57) ABSTRACT A cup bearing includes a cylindrical component having first and second axial ends and defining a lumen therethrough. The cylindrical component includes first and second end portions proximal to the first and second axial ends, respectively. The cylindrical component includes a corrugated portion disposed axially between the first and second end portions. The corrugated portion includes a plurality of corrugations extending radially inwardly. A corrugation of the plurality of corrugations includes a ridge defining a first inner radius of the lumen. The cup bearing further includes a first radial stop associated with the first end portion. The first radial stop defines a second inner radius greater than the first inner radius. The cup bearing also includes an end cap coupled to the second axial end of the cylindrical component.

24 Claims, 4 Drawing Sheets

U.S. PATENT DOCUMENTS

| | | | |
|---|---|---|---|
| 5,573,846 A | 11/1996 | Harig et al. | |
| 5,871,286 A | 2/1999 | Kern et al. | |
| 5,971,617 A | 10/1999 | Woelki et al. | |
| 6,258,413 B1 | 7/2001 | Woelki et al. | |
| 6,264,566 B1 * | 7/2001 | Nieman et al. | 464/132 |
| 6,289,590 B1 | 9/2001 | McDonald | |
| 6,357,918 B1 | 3/2002 | Kagohara et al. | |
| 6,373,066 B1 | 4/2002 | Penn | |
| 6,445,098 B1 | 9/2002 | Materne | |
| 6,461,679 B1 | 10/2002 | McMeekin et al. | |
| 6,520,859 B2 | 2/2003 | Beitzel et al. | |
| 6,609,830 B2 | 8/2003 | Bank et al. | |
| 6,685,360 B2 | 2/2004 | Murphy et al. | |
| 6,703,095 B2 | 3/2004 | Busshoff et al. | |
| 6,863,443 B2 | 3/2005 | Mahling | |
| 6,979,129 B2 | 12/2005 | Farbaniec et al. | |
| 7,025,679 B2 | 4/2006 | Menosky et al. | |
| 7,117,709 B2 | 10/2006 | Gotzmann et al. | |
| 2002/0082092 A1 * | 6/2002 | Beitzel et al. | 464/132 |
| 2005/0087970 A1 | 4/2005 | Ulintz | |
| 2005/0169562 A1 | 8/2005 | Lee et al. | |
| 2006/0251887 A1 | 11/2006 | Welsch | |
| 2007/0212198 A1 | 9/2007 | Cordivari et al. | |
| 2007/0234839 A1 | 10/2007 | Cordivari | |
| 2009/0087126 A1 | 4/2009 | Hagan et al. | |
| 2009/0224618 A1 | 9/2009 | Bhatti | |
| 2011/0211780 A1 | 9/2011 | Hagan et al. | |

FOREIGN PATENT DOCUMENTS

| | | |
|---|---|---|
| DE | 102004016099 A1 | 10/2005 |
| EP | 168663 B1 | 11/1989 |
| EP | 558282 A1 | 9/1993 |
| GB | 970392 | 9/1964 |
| GB | 1064597 A | 4/1967 |
| GB | 2136063 B | 2/1986 |
| GB | 2184200 A | 6/1987 |
| JP | 11148518 A | 6/1999 |
| JP | 3136303 B2 | 12/2000 |
| JP | 2001146924 A | 5/2001 |
| JP | 2001248657 A | 9/2001 |
| JP | 2006132708 A | 5/2006 |
| SU | 382201 | 5/1973 |
| WO | 02070908 A1 | 9/2002 |
| WO | 2007111810 A1 | 9/2002 |
| WO | 2009045953 A1 | 4/2009 |
| WO | 2011060043 A2 | 5/2011 |

OTHER PUBLICATIONS

Singh, P., Gupta, B.D., Kapur, V.K., A study of corrugated thrust bearings, (1993) Wear, 160 (1), pp. 13-26. Abstract Only.

Chen, W.W., Feng, Y.Y., Development and test of a new type of corrugated sheet thrust bearing, (1986) Machine Design & Research, (4 , 1986), pp. 6-16. Abstract Only.

International Search Report for PCT/US2007/005665 dated Aug. 2, 2007, 2 pgs.

International Search Report for PCT/US2010/056189 dated Aug. 2, 2011, 3 pgs.

International Search Report for PCT/US2008/078105 dated Dec. 9, 2008, 1 pg.

U.S. Appl. No. 11/386,461, filed Mar. 22, 2006, Inventors: Matthew A. Cordivari.

U.S. Appl. No. 11/865,250, filed Oct. 1, 2007, Inventors: Timothy J. Hagan et al.

U.S. Appl. No. 13/105,660, filed May 11, 2011, Inventors: Timothy J. Hagan et al.

* cited by examiner

CLOSED END BEARING CUP

CROSS-REFERENCE TO RELATED APPLICATION(S)

The present application claims priority from U.S. Provisional Patent Application No. 61/259,859, filed Nov. 10, 2009, entitled "CLOSED END BEARING CUP," naming inventor Timothy J. Hagan, which application is incorporated by reference herein in its entirety.

FIELD OF THE DISCLOSURE

This disclosure, in general, relates to closed end bearing cups and methods for forming same.

BACKGROUND

Plain bearing cups or bushes have been used in industry in the journaling of shafts. Conventionally, closed end bearing cups are used to secure the terminal end of the shaft and permit the shaft to rotate. Such plain bearing cups are particularly useful in universal joints which permit the translation of rotational force between shafts having different axial directions. For example, universal joints are particularly useful in steering columns.

However, conventional bearing cups are inflexible and as such, fail to absorb radial shock. Radial shock can result in damage to the bearing cup or damage to the shaft. Over time, repeated damage to the cup or shaft can cause friction between the shaft and the bearing cup or can cause uneven rotation. In addition, as a result of damage, the shaft can have more radial play within the bearing cup, leading to a feeling of looseness in the joint or, when used in steering columns, lash. Ultimately, damage to the bearing cup or the shaft can lead to failure of one or more components.

As such, an improved bearing cup would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

In an exemplary embodiment, a bearing cup includes a cylindrical component and an end cap covering at least a portion of an axial end of the cylindrical component. The cylindrical component includes a corrugated portion separating first and second end portions disposed proximal to and contiguous with the first and second axial ends of the cylindrical components. The first and second axial end portions can be uncorrugated. The corrugated portion includes a plurality of corrugations extending radially inwardly from an outer surface of the cylindrical component toward the axis of the cylindrical component. The radially inwardly extending corrugations terminate in ridges that define an inner radius of the cylindrical component and are to contact a shaft inserted into the bearing cup. In an example, radial shock load stops can be associated with the first and second end portions and define inner diameters that are greater than the inner diameter defined by the ridges of the corrugations. In an example, a grease or dry lubricant can be placed on the inside of the bearing cup. In another example, the cylindrical component or the end cap can be formed of materials having a low coefficient of friction. In a particular example, the cylindrical component or the end cap can be formed of a multilayer composite material including a substrate and a surface layer formed of a low coefficient friction material. One or more such bearing cups can be used in a universal joint. Such a universal joint can be used in a steering column.

In a further exemplary embodiment, a method for forming a bearing cup includes shaping a corrugated sheet material to form a cylindrical component including a plurality of corrugations facing radially inwardly toward a central axis of the cylindrical component. The method can further include coupling an end cap to an axial end of the cylindrical component. In addition, the method can include hemming the cylindrical component at one or both axial ends to form a radial stop. In another example, the method can include inserting a radial stop ring into an axial end of the cylindrical component and coupling the radial stop ring to the cylindrical component.

Figure 1:
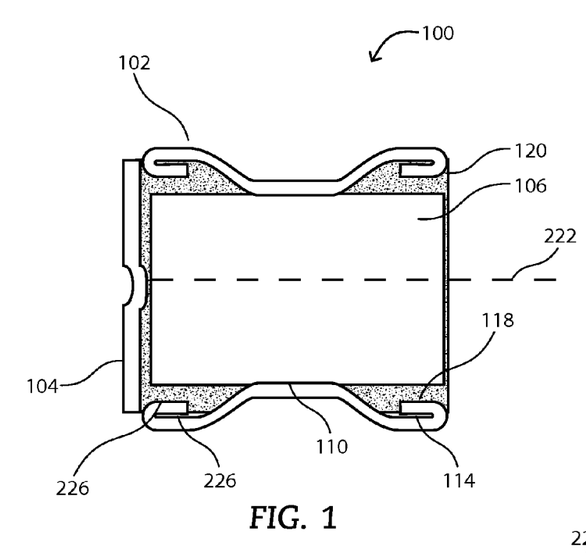
FIG. 1 includes an illustration of an axial plane cross-section of an exemplary bearing cup.

In particular, the bearing cup includes a cylindrical component defining a lumen into which a shaft can be inserted and includes an end cap or thrust cap coupled to an axial end of the cylindrical component and at least partially covering the axial end. FIG. 1 includes an illustration of an exemplary embodiment of a bearing cup 100. The bearing cup 100 includes a cylindrical component 102 and a thrust cap or end cap 104 connected to an axial end of the cylindrical component 102. The cylindrical component 102 defines a lumen 106 and is disposed around an axis 108. The end cap 104 at least partially covers an axial end of the cylindrical component 102 or encloses the axial end. An opposite axial end of the cylindrical component defines an opening into which a shaft can be inserted. In use, a shaft can be inserted into the lumen 106 through the open axial end. The cylindrical component 102 provides radial support for the shaft and the end cap provides axial support for the shaft.

Figure 2:
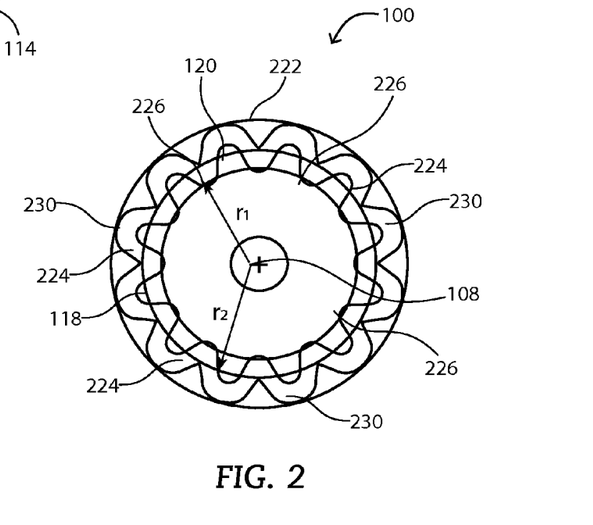
FIG. 2 includes an illustration of an end view of a bearing cup.

The cylindrical component 102 can include an end portion 112 and an end portion 114 separated by a corrugated portion 110. As illustrated, the end portions 112 and 114 are disposed on opposite axial ends of the cylindrical component 102. In an example, the end portions 112 and 114 are contiguous with respective axial ends of the cylindrical component 102 and can be uncorrugated. As illustrated in FIG. 2, the corrugated portion 110 includes a plurality of corrugations 224 extending radially inwardly from an outer surface 222 towards the axis 108 of the cylindrical component 102. The corrugations have inner ridges 226 that define an inner radius, $r_1$, or an inner diameter of the bearing cup 100 and have outer ridges 230 that define an outer radius or outer diameter of the bearing cup 100.

In an example, the end portions 112 and 114 define an inner radius that is greater than the inner radius, $r_1$, defined by the inner ridges 226 of the corrugations 224. By extension the end portions 112 and 114 define inner diameters that are greater than the inner diameter defined by the inner ridges 226 of the corrugations 224. In an example, the outer ridges 230 of the corrugations 224 and the end portions 112 and 114 define an outer diameter of the cylindrical component 102 forming the outer surface 222. As illustrated in FIG. 1, the end portions 112 and 114 are folded or hemmed to form radial stops 116 and 118. Alternatively, radial stop rings can be used in place of the hemmed portions 116 and 118. The radial stops 116 and 118 have an inner radius, $r_2$, which is greater than the inner radius, $r_1$, defined by the inner ridges 226 of the corrugations 224. In use, a shaft is inserted into the bearing cup 100 and can contact the inner ridges 226 of the corrugations 224. In the event of radial shock, the corrugations 224 can flex, permitting the shaft to travel in a radial direction. In the event of a large radial shock, the corrugations 224 can flex to permit the shaft to move until the shaft hits the radial stop 116 or 118. In particular, the stops 116 and 118 are configured to limit movement of the shaft and to limit flexing of the corrugations 224 to a radius that does not result in inelastic flexing of the corrugations 224. A radius that results in inelastic deformation of the corrugations 224 is defined as an inelastic deformation radius.

While the corrugations 224 are illustrated as being longitudinal or parallel with an axis of the cylindrical component 102, the corrugations 224 can extend latitudinally within a plane perpendicular to the axis of the cylindrical component 102. In another example, the corrugations 224 can spiral longitudinally and around the axis.

In a particular example, the corrugated portion 110 includes at least 8 inner ridges, such as at least 10 inner ridges, at least 12 inner ridges, or even at least 16 inner ridges. In another example, the corrugated portion 110 can include not greater than 50 inner ridges. As illustrated in FIG. 2, each of the inner ridges 226 has the same radial distance from the axis 108. Alternatively, a subset of the inner ridges 226 can extend inwardly further than another subset of the inner ridges 226.

The thrust cap or end cap 104 can be coupled to the cylindrical component 102 at an axial end. For example, the end cap 104 can be welded to the cylindrical component 102. In another example, the end cap 104 can be frictionally fit, having portions that extend along the inner surface of an end portion of the cylindrical component. In a further example, the end cap 104 can be integrally formed with the cylindrical component 102.

In addition, a grease or dry lubricant can be disposed inside the bearing cup 100. For example, grease or dry lubricant 102 can be disposed along inner surfaces of the cylindrical component 102 and the end cap 104. An exemplary lubricant includes polymers resins, polymer powders, graphite, graphene, expanded graphite, sulfides such as molybdenum disulfide and tungsten disulfide, boron nitride, talc, calcium fluoride, cerium fluoride, or any combination thereof.

Figure 3:
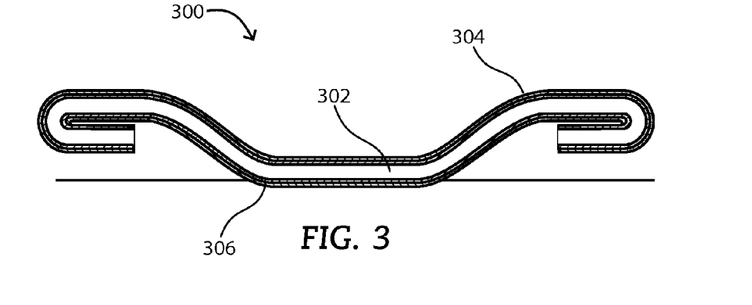
FIG. 3 includes an illustration of an axial plane cross-section of a wall of an exemplary bearing cup.

In a particular example, the cylindrical component 102 or the end cap 104 can be formed of a multilayer material. For example, as illustrated in FIG. 3, a multilayer material 300 can include a substrate 302 and a low coefficient of friction layer 306 disposed on a surface of the substrate 302. Further, the multilayer material 300 can include a protective coating 304, such as an elastomeric or inorganic coating, on another surface of the substrate 302. For example, the protective coating 304 can form an outside surface of the cylindrical component.

In an example, substrate 302 can be formed of a metallic, polymeric, or ceramic material. In an example, the metal can include iron, copper, tin, aluminum, titanium, other transitional metals, an alloy such as steel, bronze, or brass, or any combination thereof. An exemplary polymer can include polyimide, polyaramid, polyketone, polyetherimide, polyphenylene sulfide, polyethersulfone, polysulfone, polyphenylene sulfone, polyamideimide, ultra high molecular weight polyethylene, a thermoplastic fluoropolymer, a polyamide, a polybenzimidazole, or any combination thereof. In an alternative example, the substrate 302 can be a mesh material.

The low coefficient of friction layer 306 can be laminated to the substrate 302. For example, the liner can include a polymer such as a fluoropolymer, acetals, polycarbonates, polyimides, polyetherimides, polyether ether ketones (PEEK), polyethylenes, polypropylenes, polysulfones (e.g., polyethersulfone), polyamides (Nylon), polyphenylene sulfides, polyurethanes, polyesters, polyphenylene oxides, liquid crystal polymer, PPS, $PPSO_2$, aromatic or aliphatic polyketone/ethers, PEI and blends and alloys thereof, or any combination thereof. An exemplary fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. An exemplary liquid crystal polymer includes aromatic polyester polymers, such as those available under tradenames XYDAR® (Amoco), VECTRA® (Hoechst Celanese), SUMIKOSUPER™ or EKONOL™ (Sumitomo Chemical), DuPont HX™ or DuPont ZENITE™ (E.I. DuPont de Nemours), RODRUN™ (Unitika), GRANLAR™ (Grandmont), or any combination thereof.

In a particular example, the substrate 302 includes the low coefficient of friction (COF) layer 306, such that the layer 306 is a laminate and substantially overlies the major surface of the substrate 302. The polymer laminate can be obtained from a sheet of material that has been skived or shaved to produce a polymer sheet having a fine thickness, such as less than about 1.0 mm thick. The substrate 302 can be laminated with the polymer sheet, such that the polymer overlies at least a major surface of the substrate 302 as a sheet of material. Optionally, an additional rigid mesh layer, such as a bronze metal mesh layer, can be introduced between the substrate 302 and the polymer laminate layer forming layer 306. Forming the composite material typically includes heat and pressure treatment, as well as an adhesive, such as a fluoropolymer hot melt adhesive, to bond the polymer laminate and the substrate 302. In one embodiment, the polymer layer can substantially overlie a majority of the surfaces of the substrate 302, such as the major surface of the substrate 302 and the sides adjacent the major surface of the substrate 302. Still, the polymer layer can be a laminate layer that substantially overlies the major surface of the substrate 302, the opposing major surface of the substrate, and the adjacent sides of the substrate. Generally, the polymer layer is pliable and suitable for forming with the metal. In an example, the polymer can be a fluoropolymer, such as a polytetrafluoroethylene (PTFE), the addition of which is suitable for use in self-lubricating bearing applications. In addition, the polymer layer can include fillers such as ceramics, ceramic fibers or carbon containing compounds. In a particular embodiment, the composite material is NORGLIDE® composite material, commercially available from Saint-Gobain Performance Plastics Corporation, 150 Dey Road, Wayne, N.J.

In addition, a protective coating 304, such as an elastomer or a protective plating, can be applied to the substrate 302. For example, the protective plating can include an inorganic material, such as a metal, metal oxide, metal nitride, or any combination thereof. In an example, the protective plating can include a metal, such as zinc. In another example, the protective plating can include metal oxide, such as an oxide of aluminum. Alternatively, the protective coating 304 can be formed of an elastomer. In an example, the elastomer can be a fluoroelastomer, a diene elastomer, a silicon elastomer, or any combination thereof.

In a particular example, a sheet material including the substrate and low coefficient of friction liner can be corrugated, cut to size, and bent into shape. In a particular example, the seams of the bent shape can be welded to form a cylindrical structure.

Figure 4:
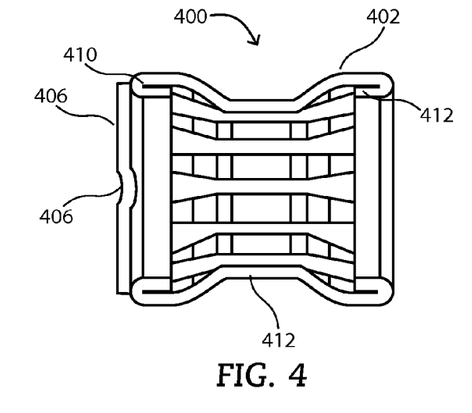
FIG. 4 includes an illustration of an axial plane cross-section of an exemplary bearing cup.
Figure 5:
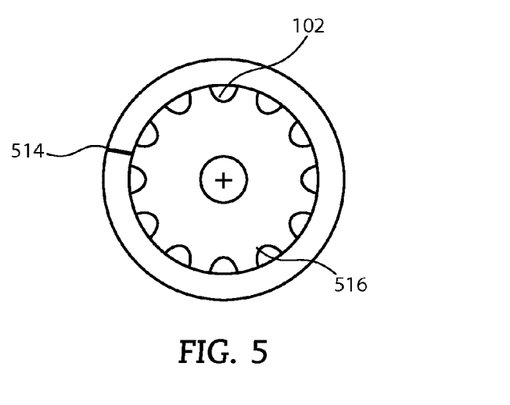
FIG. 5 includes an illustration of an end view of an exemplary bearing cup.

FIG. 4 and FIG. 5 include illustrations of another exemplary embodiment of a bearing cup 400, including a cylindrical component 402 formed of a corrugate rolled to form a slit 514 and including a dimpled end cap 406 coupled to an axial end of the corrugated component 402. The cylindrical component 402 includes a corrugated portion 404 separating two end portions 410 and 412 disposed at opposite axial ends of the cylindrical component 402. As illustrated, the first and second end portions 410 and 412 are hemmed to form radial stops. As a result of the corrugate being rolled, a slit 514 is formed between radial ends of the corrugated material. A weld can be placed at the slit 514 to secure the shape of the cylindrical component 402.

In a particular example, the end cap 406 includes a dimple 408. As illustrated, the dimple 408 extends axially into the cylindrical component 402 in alignment with a central axis of the cylindrical component 402. Alternatively, the end cap 406 can include more than one dimple disposed at radial distances from the axis of the cylindrical component.

Figure 6:
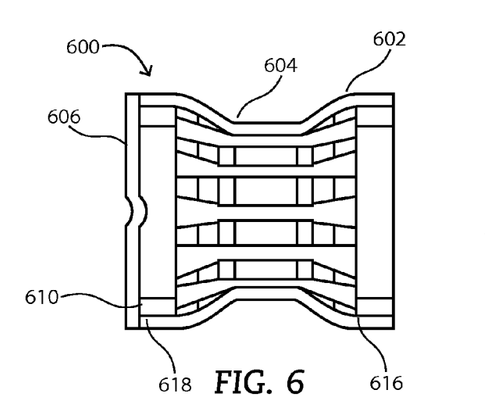
FIG. 6 includes an illustration of an axial plane cross-section of an exemplary bearing cup.
Figure 7:
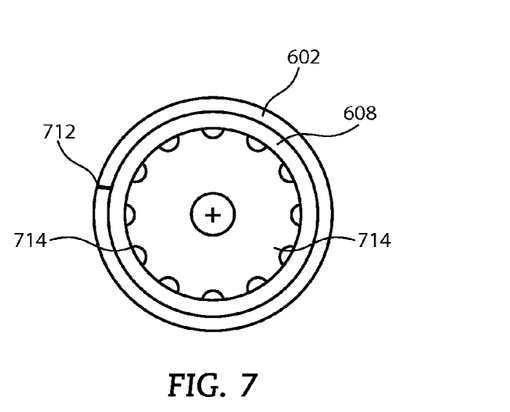
FIG. 7 includes an illustration of an end view of an exemplary bearing cup.

In a further example, FIG. 6 and FIG. 7 include illustrations of another exemplary embodiment of a bearing cup 600. The bearing cup 600 includes a cylindrical component 602 and end cap 606. The cylindrical component 602 includes a corrugated portion 604 separating end portions 616 and 618. In addition, radial stop rings 608 and 610 are associated with the end portions 616 and 618 at opposite axial ends of the cylindrical component 602. In an example, the radial stop rings 608 and 610 are solid rings formed of high modulus material, such as a metal or polymer. The radial stop rings 608 and 610 can be secured to the end portions 616 and 618 of the cylindrical component 602, such as by adhesive or welding.

As illustrated in FIG. 7, the rolled corrugate includes a slit 712 that can be welded. Further, ridges of the corrugations 714 of the corrugated portion 604 define a radius that is smaller than the inner radius of the stop rings 608 and 610. As such, the radial stop rings 608 and 610 afford the corrugations 714 limited play to permit the corrugations 714 to flex in response to radial shock. In an example, the inner radius of the rings 608 and 610 limits the radial play of a shaft to prevent inelastic flexing of the corrugations 714.

Figure 8:
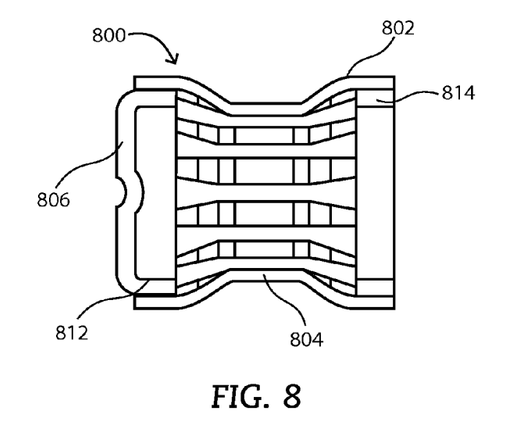
FIG. 8 includes an illustration of an axial plane cross-section of an exemplary bearing cup.
Figure 9:
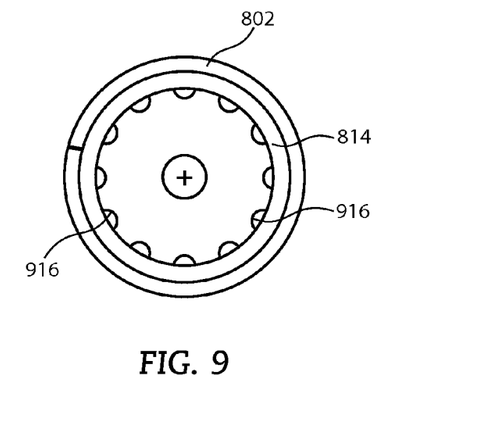
FIG. 9 includes an illustration of an end view of an exemplary bearing cup.

FIG. 8 and FIG. 9 include illustrations of an additional exemplary embodiment 800, including a cylindrical component 802 and a cup style end cap 806. The cylindrical component 802 includes a corrugated portion 804. At an open axial end, the bearing cup 800 includes a radial stop ring 814. Alternatively, the end of the cylindrical component 802 can be hemmed to form a radial stop. At an opposite axial end, the cup style end cap 806 is inserted into the cylindrical component along an inner wall of an end portion 812. Alternatively, the cup style end cap 806 can include walls that extend around an outside of the cylindrical component 802. A cylindrical wall portion 810 of the cup styled end cap 806 can also effectively form a stop. As illustrated in FIG. 9, the corrugations 916 extend radially inwardly defining an inner radius that is smaller than the inner radius of the radial stop ring 814 or the wall 810 of the cup style end cap 806, providing for flexing in response to radial load.

Figures 10, 11, 12:
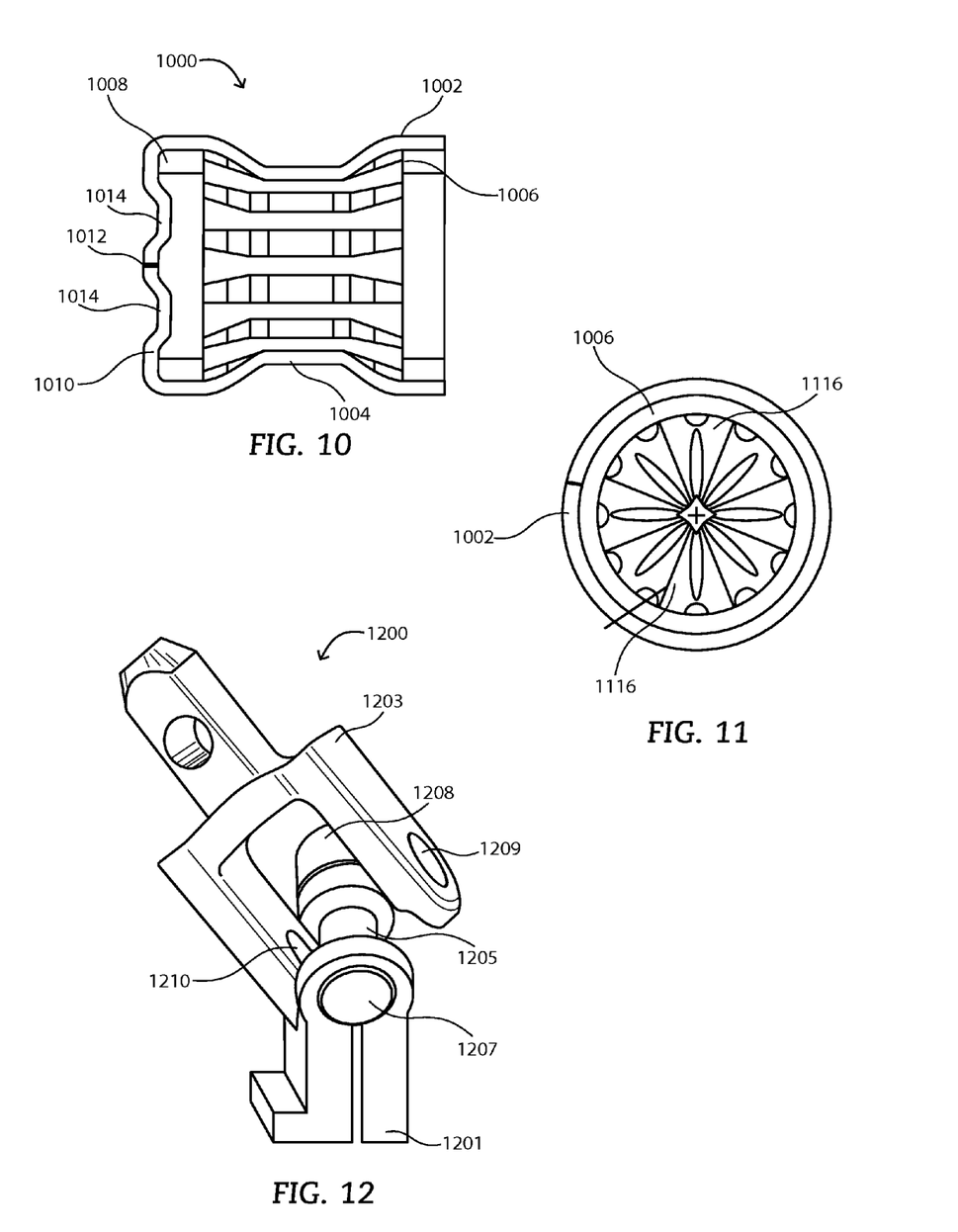
FIG. 10 includes an illustration of an axial plane cross-section of an exemplary bearing cup.
FIG. 11 includes an illustration of an end view of an exemplary bearing cup.
FIG. 12 includes an illustration of an exemplary universal joint.

In a further exemplary embodiment illustrated in FIG. 10 and FIG. 11, a bearing cup 1000 includes a cylindrical portion 1002 integrally formed with a corrugated thrust surface 1010. The cylindrical portion 1002 includes a corrugated portion 1004. Radial stop rings 1006 and 1008 are disposed on opposite axial sides of the corrugated portion 1004.

As illustrated in FIG. 11, the integral corrugated end cap 1010 is formed from a plurality of tines 1116 whose points contact at a central location 1012, which is aligned with an axial center of the cylindrical portion 1002. In an example, the central location 1012 can have a gap. The width of the gap can be not greater than about 0.1 mm, such as not greater than about 0.05 mm, or even not greater than about 0.025 mm. The tines 1116 can include corrugations 1014 extending axially inward into the cylindrical portion 1002. In addition or alternatively, the tines 116 can be configured to form a dimple, such as a dimple aligned with the axial center of the cylindrical portion 1002.

To form the exemplary bearing cup 1000, a sheet material can be corrugated and cut with a series of triangular tines extending from a side that is to form an axial end of the bearing cup. When the corrugate is rolled, the tines 1116 extend in one axial direction. A stop ring 1008 can be inserted into the rolled corrugate and the tines folded to form the end cap 1010 and secure the stop ring 1008. A second stop ring 1006 can be inserted into an opposite axial end of the cylindrical portion 1002 and secured therein.

In reference to particular applications of the foregoing bearings, according to one embodiment, a bearing cup can be housed within a universal joint, as illustrated in FIG. 12. FIG. 12 illustrates a universal joint 1200 having two U-shaped arm portions 1201 and 1203, and a t-joint assembly 1205 joining the U-shaped arm portions 1201 and 1203. Each of the arms of the t-joint assembly 1205 can be coupled to bearing cups in accordance with previously discussed embodiments. According to one embodiment, each of the bearing cups can be disposed with bearing retainers 1207, 1208, 1209, and 1210 (1207-1210), which are coupled to the U-shaped arm portions 1201 and 1203. The bearing retainers can have a cup-shape with a lip at the open end for retaining the bearing cup within. The bearing cups can be disposed within the bearing retainers 1207-1210 such that they can freely spin within the bearing retainers 1207-1210. The bearing cups can facilitate rotational freedom of the t-shaped assembly 1205 and transference of rotational forces from one U-shaped arm portion 1203 to the other U-shaped arm portion 1201 during engagement of the universal joint.

Figure 13:
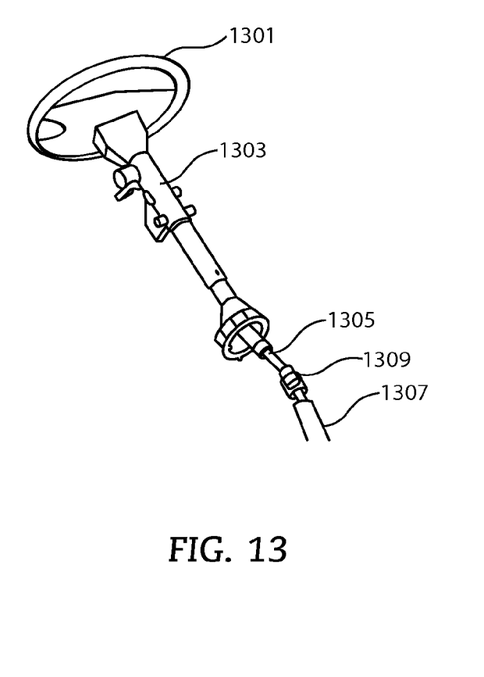
FIG. 13 includes an illustration of an exemplary steering column.

In further reference to particular applications, FIG. 13 provides an illustration of a steering assembly 1300 according to one embodiment. A steering assembly 1300 is provided that includes a first shaft 1305 having a first end and a second end. The first end is coupled to a steering input device 1301. As illustrated, the steering assembly 1300 also includes a second shaft 1307 having a first end and a second end and a coupling 1309 fastened to the second end of the first shaft 1305 and the first end of the second shaft 1307. As described previously, and illustrated in FIG. 12, the coupling can be a universal joint and can include two U-shaped arms coupled to a t-shaped assembly. According to one embodiment, the coupling includes a substantially t-shaped assembly having plurality of arms and a plurality of bearing cups disposed at the ends of each of the arms. The bearing cups can have a substantially cylindrical shape with a closed end. Bearing cups, in accordance with previously described embodiments, can be disposed within bearing retainers coupled to the U-shaped arms.

According to a particular embodiment, the coupling can be a Cardan-style universal joint. In the context of this particular application, according to one embodiment, the coupling can withstand an axial load of greater than about 100N, such as greater than about 150 N, or even 200 N. In further reference to the mechanical properties of the steering assembly, in another embodiment, during operation the coupling has a lash of not greater than about 0°05' under a torque of about 1400N, such as not greater than about 0°03', or even about 0°02' under a torque of about 1400N.

In an exemplary method, a substrate can be formed into a strip and the strip corrugated and shaped to form a cylindrical component. The corrugations project radially inwardly relative to an outer surface of the cylindrical component. Radial stops can be formed or inserted in the cylindrical component, and an end cap can attach to an axial end of the cylindrical component.

In an exemplary embodiment, the process is initiated by providing a composite strip that includes a substantially rigid substrate and an overlying polymer layer. The substantially rigid substrate can be formed as a strip having a major surface. The longest dimension of the substrate is the length and the second longest dimension is the width. The major surface of the substrate is the plane defined by the dimensions of the length and the width. As such, the shortest dimension of the substrate strip is the thickness, and according to one embodiment, the thickness of the composite strip is not greater than about 5.0 mm, such as not greater than about 4.0 mm, or even not greater than about 3.0 mm. The total thickness of the composite strip is dependent in part upon the thickness of the substantially rigid substrate, which according to one embodiment is not greater than about 3.0 mm, such as not greater than about 1.0 mm, or even not greater than about 0.5 mm.

According to another embodiment, the step of providing a composite material includes cutting a composite strip of discrete dimensions from a larger piece of composite material. For most applications, the length of the composite strip is typically not greater than about 100 cm. According to one embodiment, the length of the composite strip is not greater than about 75 cm, or about 50 cm. Still, the length of the composite strip can be less, such as not greater than about 25 cm, or even about 10 cm. In a particular embodiment, the length of the composite strip is between about 75 cm and about 5 cm. Cutting of the composite strip can be accomplished using manual or automatic devices.

In an example, the strip can be corrugated. For example, the strip can be corrugated in a portion having a length that is parallel with the length of the strip. To form corrugations that are longitudinal in the cylindrical component, the ridges of the corrugations can be parallel with the width direction. In particular, the corrugations formed in the portion provide for uncorrugated potions.

Once corrugated, the composite strip can be machine fed into a channel or can be manually fed into the channel. The channel can have dimensions substantially similar to the dimensions of the composite strip such that at least a portion of the composite strip is secured in the channel during forming.

In an exemplary embodiment, after the composite strip is engaged in the channel, the composite strip engages a mandrel. Generally, the composite strip can engage the mandrel by contacting a portion of the strip to the surface of the mandrel. Engaging the mandrel can further include securing a portion of the composite strip against the mandrel.

Accordingly, the mandrel can have a selected geometry and contour substantially similar to the desired geometry and contour of the final shaped composite piece. Generally, the mandrel can have a polygonal shape, particularly a symmetrical polygonal shape, such as a circle, or the like. According to a particular embodiment, the mandrel has a circular contour for forming a shaped composite piece having a circular contour, whereby the circumference of the mandrel substantially defines the inner circumference of the shaped composite piece. Generally, the size of the mandrel can be altered depending upon the desired size of the shaped composite. In the context of forming a shaped composite having a circular contour, the diameter of the mandrel can be not less than about 1 cm, such as not less than about 2.5 cm, and particularly within a range of diameters between about 2.5 cm and about 15 cm.

After engaging the composite strip with the mandrel, the composite strip can be shaped around the contour of the mandrel. According to one embodiment, a suitable technique for forming the composite strip around the mandrel includes rolling the major surface of the composite strip under a sufficient force to guide the composite strip around the mandrel. According to one embodiment, the rolling force is not less than about 2.0 kN, such as not less than about 4.5 kN, or about 10 kN. In various embodiments, the force applied to the major surface of the composite strip can be not less than about 15 kN and particularly within a range between about 5 kN and about 50 kN.

The shaping process can also be aided by gripping the composite strip and guiding the composite strip around the mandrel while rolling the major surface of the composite strip. The process can utilize one or a plurality of gripping mechanisms, such as jaws or pincers, displaced around the mandrel for engaging the composite strip and maintaining sufficient force to aid the shaping process. In a particular embodiment, the jaws form the composite strip along the shape of the mandrel while rollers move over the major surface of the composite strip. After forming half of the composite shape, another set of jaws can grip the ends of the composite strip and guide the composite strip along the remainder of the mandrel to finish the shaping process while the major surface of the composite material is rolled under a sufficient force. Upon completion of the shaping process, the composite strip can be removed from around the shape of the mandrel.

Once the cylindrical component is formed, the corrugations extend radially inwardly. A slit formed at the joint of the radial ends of the formed sheet material can be welded to secure the shape of the cylindrical component.

To form radial stops, one or both of the axial end portions can be hemmed to form radial stops. Alternatively, a radial stop ring can be inserted inside the axial end portion. The radial stop ring can be secured within the axial end portion. For example, the radial stop ring can be welded or adhered with adhesive to the axial end portions of the cylindrical component.

An end cap can be secured to an axial end of the cylindrical component. For example, an end cap can be welded to the axial end. Alternatively, the end cap can be adhered using an adhesive. In a further alternative, the strip can include triangular tines extending from a side parallel to the length dimension. Once the strip is shaped into a cylindrical component, the tines can be bent to form the end cap.

In an exemplary embodiment, a cup bearing includes a cylindrical component having first and second axial ends and defining a lumen therethrough. The cylindrical component includes first and second end portions proximal to the first and second axial ends, respectively. The cylindrical component includes a corrugated portion disposed axially between the first and second end portions. The corrugated portion includes a plurality of corrugations extending radially inwardly. A corrugation of the plurality of corrugations includes a ridge defining a first inner radius of the lumen. The cup bearing further includes a first radial stop associated with the first end portion. The first radial stop defines a second inner radius greater than the first inner radius. The cup bearing also includes an end cap coupled to the second axial end of the cylindrical component.

In an example, the first radial stop includes a hemmed portion of the first end portion of the cylindrical component. In another example, the first radial stop comprises a stop ring. For example, the stop ring is disposed on an inner surface of the first end portion. In a further example, the cup bearing further includes a second radial stop associated with the second end portion. The second radial stop defines a third inner radius greater than the first inner radius. The second radial stop can include a hemmed portion of the second end portion of the cylindrical component. The second radial stop can include a stop ring disposed on an inner surface of the second end portion.

In an additional example, the end cap includes a dimple projecting inwardly into the lumen of the cylindrical component. In a further example, the dimple is aligned with an axis of the cylindrical component.

In another example, the cylindrical component includes tines coupled to the second end portion. The tines project radially inwardly to form the end cap. In a further example, each corrugation of the plurality of corrugations includes a ridge extending longitudinally.

In an example, the second inner radius is less than an inelastic deformation radius.

In a further example, the cylindrical component includes a multilayer material including a substrate and a low friction material disposed on the substrate to form an inner surface of the cylindrical component. For example, the cup bearing can further include a protective coating disposed on the substrate to form an outer surface of the cylindrical component. The protective coating can include an elastomeric coating. In another example, the protective coating includes an inorganic coating. In an additional example, the cup bearing includes a lubricant disposed in the lumen of the cylindrical component.

In another exemplary embodiment, a joint component includes a cup bearing. The cup bearing includes a cylindrical component having first and second axial ends and defining a lumen therethrough. The cylindrical component includes first and second end portions proximal to the first and second axial ends, respectively. A corrugated portion is disposed axially between the first and second end portions. The corrugated portion includes a plurality of corrugations extending radially inwardly. A corrugation of the plurality of corrugations includes a ridge defining a first inner radius of the lumen. The cup bearing further includes a first radial stop associated with the first end portion. The first radial stop defines a second inner radius that is greater than the first inner radius. The cup bearing further includes an end cap coupled to the second axial end of the cylindrical component. The joint component further includes a shaft having an axial end disposed in the lumen of the cylindrical component.

In an example, the first radial stop includes a hemmed portion of the first end portion of the cylindrical component. In another example, the first radial stop includes a stop ring. The stop ring can be disposed on an inner surface of the first end portion.

In a further example, the cup bearing further includes a second radial stop associated with the second end portion. The second radial stop defines a third inner radius that is greater than the first inner radius. The second radial stop can include a hemmed portion of the second end portion of the cylindrical component. The second radial stop can include a stop ring disposed on an inner surface of the second end portion.

In an additional example, the end cap includes a dimple projecting inwardly into the lumen of the cylindrical component. In another example, the cylindrical component includes tines coupled to the second end portion. The tines can project radially inwardly to form the end cap.

In another example, the cylindrical component includes a multilayer material including a substrate and a low friction material disposed on the substrate to form an inner surface of the cylindrical component.

In an additional embodiment, a method of forming a cup bearing includes cutting a sheet material to form a blank, corrugating a portion of the blank to form a plurality of corrugations, and shaping the blank into a cylindrical component having first and second axial ends and defining a lumen. The plurality of corrugations project radially inwardly toward an axis of the cylindrical component. The method further includes coupling an end cap to an axial end of the cylindrical component.

In an example, the method further includes hemming a first axial end of the cylindrical component to form a radial stop. A corrugation of the plurality of corrugations can include a ridge defining a first inner radius. The radial stop defines a second inner radius that is greater than the first inner radius. In a further example, the method further includes coupling a radial stop ring to an end portion of the cylindrical component proximal to the first axial end.

In a further embodiment, a cup bearing includes a cylindrical component having first and second axial ends and defining a lumen therethrough. The cylindrical component includes first and second end portions proximal to the first and second axial ends, respectively. A corrugated portion is disposed axially between the first and second end portions. The corrugated portion includes a plurality of corrugations extending radially inwardly. A corrugation of the plurality of corrugations includes a ridge defining a first inner radius of the lumen. The cup bearing further includes first and second radial stops associated with the first and second end portions, respectively. The first and second radial stops have inner radii greater than the first inner radius. The cup bearing includes an end cap coupled to the second axial end of the cylindrical component.

In another embodiment, a joint component includes a cup bearing. The cup bearing includes a cylindrical component having first and second axial ends and defining a lumen therethrough. The cylindrical component includes first and second end portions proximal to the first and second axial ends, respectively. A corrugated portion is disposed axially between the first and second end portions. The corrugated portion includes a plurality of corrugations extending radially inwardly. A corrugation of the plurality of corrugations includes a ridge defining a first inner radius of the lumen. The cup bearing includes first and second radial stops associated with the first and second end portions, respectively. The first and second radial stops have inner radii greater than the first inner radius. The cup bearing further includes an end cap coupled to the second axial end of the cylindrical component. The joint component further includes a shaft having an axial end disposed in the lumen of the cylindrical component.

In an additional embodiment, a cup bearing includes a cylindrical component having first and second axial ends and defining a lumen therethrough. The cylindrical component includes first and second end portions proximal to the first and second axial ends, respectively. A corrugated portion is disposed axially between the first and second end portions. The corrugated portion includes a plurality of corrugations extending radially inwardly. A corrugation of the plurality of corrugations includes a ridge defining a first inner radius of the lumen. The cup bearing includes a first stop ring associated with the first end portion. The first stop ring defines a second inner radius that is greater than the first inner radius. The cup bearing also includes an end cap coupled to the second axial end of the cylindrical component.

In another embodiment, a joint component includes a cup bearing. The cup bearing includes a cylindrical component having first and second axial ends and defining a lumen therethrough. The cylindrical component includes first and second end portions proximal to the first and second axial ends, respectively. A corrugated portion is disposed axially between the first and second end portions. The corrugated portion includes a plurality of corrugations extending radially inwardly. A corrugation of the plurality of corrugations includes a ridge defining a first inner radius of the lumen. The cup bearing includes a first stop ring associated with the first end portion. The first stop ring defines a second inner radius that is greater than the first inner radius. The cup bearing also includes an end cap coupled to the second axial end of the cylindrical component. The joint component also includes a shaft having an axial end disposed in the lumen of the cylindrical component.

In a further embodiment, a cup bearing includes a cylindrical component having first and second axial ends and defining a lumen therethrough. The cylindrical component includes first and second end portions proximal to the first and second axial ends, respectively. A corrugated portion is disposed axially between the first and second end portions. The corrugated portion includes a plurality of corrugations extending radially inwardly. A corrugation of the plurality of corrugations includes a ridge defining a first inner radius of the lumen. The first end portion defines a radial stop defining a second inner radius. The second inner radius is greater than the first inner radius. The cup bearing further includes an end cap coupled to the second axial end of the cylindrical component.

In an additional embodiment, a joint component includes a cup bearing. The cup bearing further includes a cylindrical component having first and second axial ends and defining a lumen therethrough. The cylindrical component includes first and second end portions proximal to the first and second axial ends, respectively. A corrugated portion disposed axially between the first and second end portions. The corrugated portion includes a plurality of corrugations extending radially inwardly. A corrugation of the plurality of corrugations includes a ridge defining a first inner radius of the lumen. The first end portion defines a radial stop defining a second inner radius. The second inner radius is greater than the first inner radius. The cup bearing further includes an end cap coupled to the second axial end of the cylindrical component. The joint component further includes a shaft having an axial end disposed in the lumen of the cylindrical component.

In a further embodiment, a cup bearing further includes a component having first and second axial ends and defining a lumen therethrough. The component includes a first end portion proximal to the first axial end and includes a plurality of tines at a second axial end. The plurality of tines extends radially inwardly over the second axial end. A corrugated portion is disposed axially between the first and second axial ends. The corrugated portion includes a plurality of corrugations extending radially inwardly. A corrugation of the plurality of corrugations includes a ridge defining a first inner radius of the lumen. The cup bearing further includes a first radial stop associated with the first end portion. The first radial stop defines a second inner radius that is greater than the first inner radius.

In an additional embodiment, a joint component includes a cup bearing. The cup bearing includes a component having first and second axial ends and defining a lumen therethrough. The component includes a first end portion proximal to the first axial end and includes a plurality of tines at a second axial end. The plurality of tines extends radially inwardly over the second axial end. A corrugated portion is disposed axially between the first and second axial ends. The corrugated portion includes a plurality of corrugations extending radially inwardly. A corrugation of the plurality of corrugations includes a ridge defining a first inner radius of the lumen. The cup bearing further includes a first radial stop associated with the first end portion. The first radial stop defines a second inner radius that is greater than the first inner radius. The joint component further includes a shaft having an axial end disposed in the lumen of the cylindrical component.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A cup bearing comprising:
a cylindrical component having first and second axial ends and defining a lumen therethrough, the cylindrical component including first and second end portions proximal to the first and second axial ends, respectively, the cylindrical component including a corrugated portion disposed axially between the first and second end portions, the corrugated portion including a plurality of corrugations extending radially inwardly, a corrugation of the plurality of corrugations including a ridge defining a first inner radius of the lumen;
a first radial stop associated with the first end portion, the first radial stop defining a second inner radius greater than the first inner radius; and
an end cap coupled to the second axial end of the cylindrical component.

2. The cup bearing of claim 1, wherein the first radial stop comprises a hemmed portion of the first end portion of the cylindrical component.

3. The cup bearing of claim 1, wherein the first radial stop comprises a stop ring.

4. The cup bearing of claim 3, wherein the stop ring is disposed on an inner surface of the first end portion.

5. The cup bearing of claim 1, further comprising a second radial stop associated with the second end portion, the second radial stop defining a third inner radius greater than the first inner radius.

6. The cup bearing of claim 5, wherein the second radial stop comprises a hemmed portion of the second end portion of the cylindrical component.

7. The cup bearing of claim 5, wherein the second radial stop comprises a stop ring disposed on an inner surface of the second end portion.

8. The cup bearing of claim 1, wherein the end cap comprises a dimple projecting inwardly into the lumen of the cylindrical component.

9. The cup bearing of claim 1, wherein the dimple is aligned with an axis of the cylindrical component.

10. The cup bearing of claim 1, wherein the cylindrical component includes tines coupled to the second end portion, the tines projecting radially inwardly to form the end cap.

11. The cup bearing of claim 1, wherein each corrugation of the plurality of corrugations include a ridge extending longitudinally.

12. The cup bearing of claim 1, wherein the second inner radius is less than an inelastic deformation radius.

13. The cup bearing of claim 1, wherein the cylindrical component comprises a multilayer material including a substrate and a low friction material disposed on the substrate to form an inner surface of the cylindrical component.

14. The cup bearing of claim 13, further comprising a protective coating disposed on the substrate to form an outer surface of the cylindrical component.

15. The cup bearing of claim 14, wherein the protective coating is an elastomeric coating.

16. The cup bearing of claim 14, wherein the protective coating is an inorganic coating.

17. The cup bearing of claim 1, further comprising a lubricant disposed in the lumen of the cylindrical component.

18. A joint component comprising:
the cup bearing of claim 1; and
an end cap coupled to the second axial end of the cylindrical component; and
a shaft having an axial end disposed in the lumen of the cylindrical component.

19. The cup bearing of claim 1 further comprising
a second radial stop associated with the second end portion, the second radial stop having a third inner radius greater than the first inner radius.

20. A method of forming a cup bearing, the method comprising:
cutting a sheet material to form a blank;
corrugating a portion of the blank to form a plurality of corrugations;
shaping the blank into a cylindrical component having first and second axial ends and defining a lumen, the plurality of corrugations projecting radially inwardly toward an axis of the cylindrical component; and
coupling an end cap to an axial end of the cylindrical component.

21. The method of claim 20, further comprising hemming a first axial end of the cylindrical component to form a radial stop, a corrugation of the plurality of corrugations including a ridge defining a first inner radius, the radial stop defining a second inner radius greater than the first inner radius.

22. The method of claim 20, further comprising coupling a radial stop ring to an end portion of the cylindrical component proximal to the first axial end.

23. A cup bearing comprising:
a component having first and second axial ends and defining a lumen therethrough, the component including first end portion proximal to the first axial end and including a plurality of tines at a second axial end, the plurality of tines extending radially inwardly over the second axial end, a corrugated portion disposed axially between the first and second axial ends, the corrugated portion including a plurality of corrugations extending radially inwardly, a corrugation of the plurality of corrugations including a ridge defining a first inner radius of the lumen; and
a first radial stop associated with the first end portion, the first radial stop defining a second inner radius greater than the first inner radius.

24. A joint component including the cup bearing of claim 23, and
a shaft having an axial end disposed in the lumen of the cylindrical component.

* * * * *